May 24, 1927.
E. C. GLEDHILL
1,629,573
STEERING GEAR FOR ROAD GRADERS
Original Filed Aug. 28, 1923      3 Sheets-Sheet 1
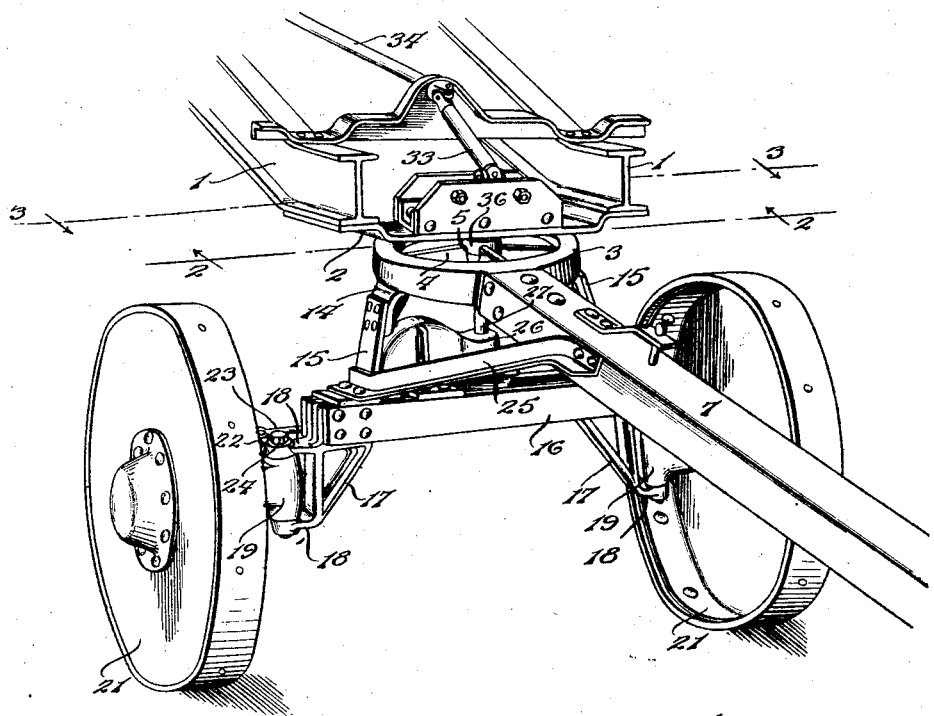
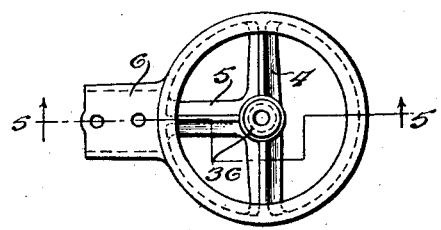
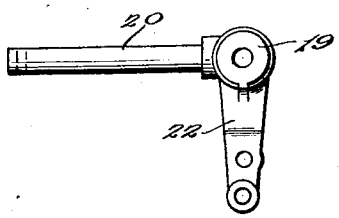
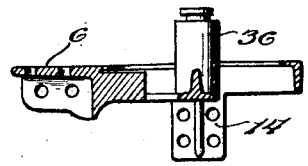
Inventor
E. C. Gledhill
By Lacy & Lacy, Attorneys

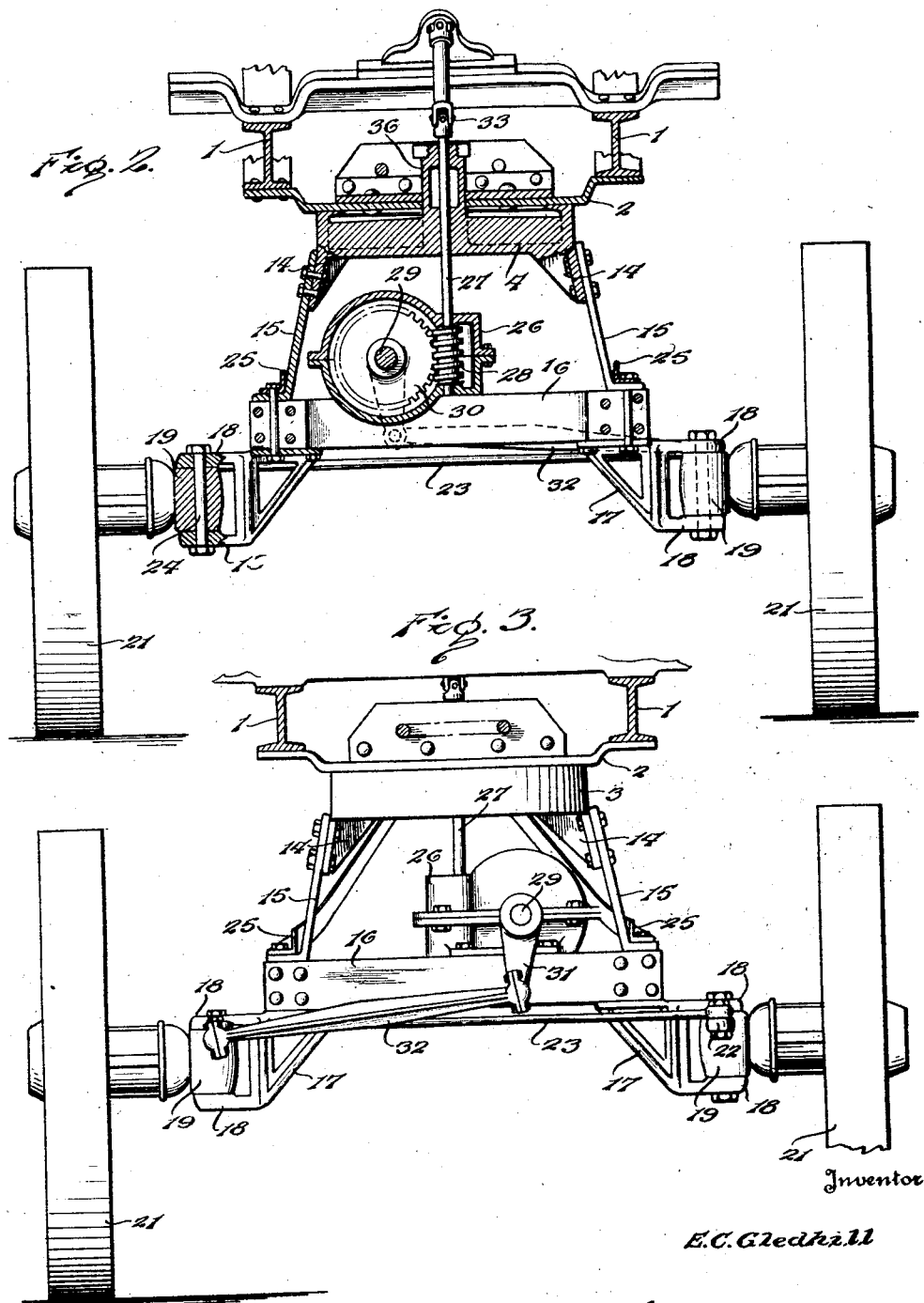

May 24, 1927.

E. C. GLEDHILL 1,629,573

STEERING GEAR FOR ROAD GRADERS

Original Filed Aug. 28, 1923     3 Sheets-Sheet 3

Inventor

E. C. Gledhill

By Lacey & Lacey, Attorneys

Patented May 24, 1927.

1,629,573

UNITED STATES PATENT OFFICE.

EDWARD C. GLEDHILL, OF GALION, OHIO.

STEERING GEAR FOR ROAD GRADERS.

Original application filed August 28, 1923, Serial No. 659,763. Divided and this application filed April 24, 1924. Serial No. 708,758.

This invention relates to steering-gear for road-graders, the present application being a division of an application filed by me August 28, 1923, Serial No. 659,763.

The primary object of the present invention is to provide means whereby the grader may be held to a path at one side of the line of travel of the tractor or draft animals whereby the tractor or the animals may travel on the crown of the road while the grader works in the ditch. Other incidental objects will appear in the course of the following description, and the invention resides in certain novel features which are illustrated in the accompanying drawings and will be hereinafter fully described and particularly pointed out.

In the drawings:

Figure 1 is a perspective view of the front truck of a road grader embodying the invention;

Fig. 2 is a transverse section of the same;

Fig. 3 is a rear elevation of the truck;

Fig. 4 is a detail plan view of the fifth wheel;

Fig. 5 is a section on the line 5—5 of Fig. 4;

Fig. 6 is a plan view of one of the spindles, and

Figure 7:
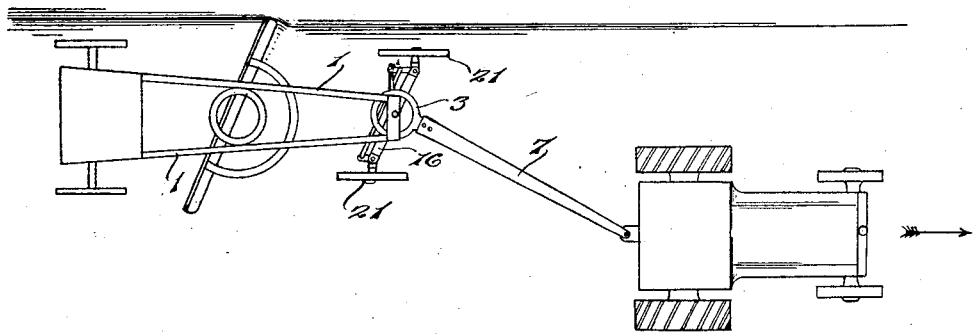
Figs. 7 and 8 are diagrammatic plan views showing practical applications of the invention.

The main frame of the machine comprises frame bars 1 which are preferably of I-beam construction and have their front ends connected by a cross beam 2 and supported by the fifth wheel 3 of the front truck. This fifth wheel is an open circular frame having a diametrical bracing bar 4, which is normally disposed transversely of the machine, and a radial forwardly projecting bracing bar 5 which connects the bar 4 with the circular rim or body of the fifth wheel at the front of said bar 4. On the front side of the fifth wheel, alined with the said bracing bar 5, is an arm 6 to which the rear end of the draft pole 7 is rigidly secured. The fifth wheel is further constructed at diametrically opposite points, alined with the brace bar 4, with depending webs or feet 14 to which are secured the upper ends of standards 15 which have their lower ends secured upon the upper side of the front axle 16. To the under side of the axle 16, I secure brackets 17 having outwardly projecting vertically spaced lugs or ears 18 between which are received the hubs 19 of the spindles 20 upon which the front wheels 21 are mounted. Projecting rearwardly from the hubs 19 are spindle arms 22, and the spindle arms at the two sides of the machine are connected by a rod or link 23 whereby equal and simultaneous movement will be imparted to the said arms if either one be actuated. A pivot bolt 24 is inserted vertically through the lugs or projections 18 and the hubs 19 fitted therebetween whereby the hubs and the spindles will be permitted to move pivotally relative to the brackets 17, as will be readily understood. Braces 25 extend between and are secured to the draft pole or tongue and the axle so as to brace the same and insure a quick response of the axle to lateral movement of the tongue in steering the machine.

Secured upon the axle is a gear casing 26 and journaled in the top and bottom of this gear casing is a vertical shaft 27 provided within the casing with a worm 28. A worm shaft 29 is also journaled in the front and rear walls of this casing at one side of the shaft 27 and carries a worm gear 30 meshing with the worm 28, as shown clearly in Fig. 2. One end of the shaft 29 projects through the adjacent end wall of the gear casing and is equipped with a crank 31 to the lower end of which is pivoted a link 32 having its outer end pivoted to the end of one spindle arm 22. The pivotal connections between the link 32 and the parts to which it is attached are preferably in the form of ball and socket joints so that there will be no binding of the parts in operation and the parts will move relative to each other freely and easily. To the upper end of the vertical shaft 27, I secure one end of a flexible coupling 33 which connects the said shaft with an operating shaft 34 extending rearwardly over the main frame and equipped at its rear end with a hand wheel or crank which may be easily reached by an operator riding upon the grader. The shaft 34 is supported in suitable brackets disposed at convenient points upon the main frame so that bending of the shaft will be avoided and it will be maintained in an operative condition at all times. The turntable is provided centrally with a hub or hollow post 36 through which the shaft 27 extends and which, in turn, extends through the front cross bar 2 of the main frame, the turntable being thereby caused to support the front end of the main frame and at the same time being capable of pivotal movement with respect thereto. Inasmuch as the shaft 27 is concentric with the hub 36, the pivotal turning movement of the fifth wheel or turntable will carry the gear casing 26 around the shaft 27 as a center without disturbing the relation between the worm 28 and the worm gear 30. If it be desired to carry the machine around a corner or to reverse its travel, the front truck is permitted to turn in the usual manner so that the course of the machine will be changed. If, however, it be found advantageous to permit the tractor or the draft animals to travel at one side of the path of the machine, the tongue or draft pole is disposed in the proper angular relation to the main frame and the axle will, of course, turn correspondingly and remain at a right angle to the tongue. The operator upon the rear platform will, by properly turning the hand wheel, rotate the shaft 34 and the shaft 27 so that the crank 31 will be rocked, through the described gearing, and the rocking movement of the crank will be transmitted through the link 32 to the attached spindle arm 22 and the connecting rod 23 will cause the mating spindle arm to follow the movement. The wheels 21 may thus be brought into parallelism with the central longitudinal line of the machine and the grader thereby caused to follow a straight path even though the draft be applied from a point at one side. Obviously, the wheels will be disposed one in advance of the other and the forward wheel will, of course, be in the ditch of the road so that it will be disposed in advance of the blade instead of being brought closer to the forward end of the blade, as is now the general condition, and the tendency of the machine to move sidewise or skid will thus be counteracted and overcome. The operator is thus enabled to keep the machine in the desired path more easily than is possible with any other machines now known to me.

Figure 8:
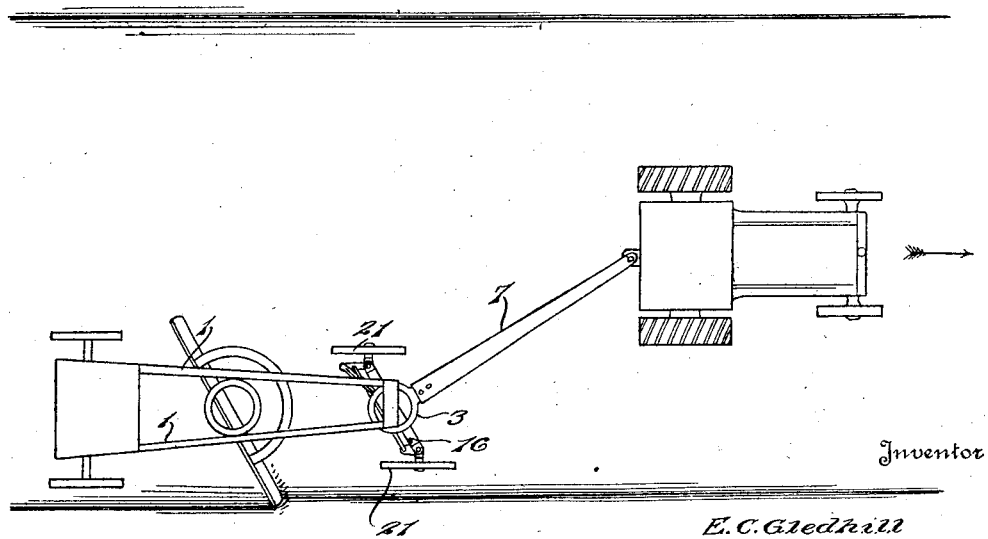

By the use of my improved steering gear, the tractor may be driven forward along a fixed path at the center of the road and the grader caused to work at either side of the road and shifted from side to side without changing the course of the tractor. By rocking the shaft 34 so as to set the wheels 21 parallel with the tongue, the grader will be guided toward the path of the tractor and then, by properly manipulating the shaft, caused to cross the path and assume a working position at the opposite side of the road, as will be understood on reference to Figs. 7 and 8.

Having thus described the invention, I claim:

1. In combination, a wheeled implement comprising a frame, a rigid rear axle and wheels carried thereby, a front axle, a turntable supported thereby, said frame having one end pivotally mounted on said turntable whereby said axle may be moved in a horizontal plane, spindles at the ends of said front axle, wheels rotatably mounted on said spindles, a vertical shaft extending coaxially of said turntable and that portion of the frame supported thereby, a gear housing mounted upon said front axle and partially inclosing said shaft, a worm gear mounted on said shaft within said housing, a second gear within said housing and meshing with said first gear, said second gear being operatively related to said spindles whereby horizontal movement of said housing and said front axle about its pivot causes corresponding movement of said spindles, and means for rotating said gears for causing movement of said spindles independently of said front axle.

2. In combination, a wheeled implement comprising a frame, a rear axle and wheels carried thereby, a front axle, a turntable supported thereby, said frame having one end pivotally mounted on said turntable whereby said axle may be moved in a horizontal plane, spindles at the ends of said front axle, wheels rotatably mounted on said spindle, a vertical shaft extending coaxially of said turntable and that portion of the frame supported thereby, a gear housing mounted upon said front axle and partially inclosing said shaft, a worm gear mounted on said shaft within said housing, a second gear within said housing and meshing with said first gear, said second gear being operatively related to said spindles whereby horizontal movement of said housing and said front axle about its pivot causes said spindles to maintain their position relative thereto and means for rotating said gears for causing movement of said spindles independently of the movement of said front axle.

In testimony whereof I affix my signature.

EDWARD C. GLEDHILL. [L. S.]